(12) United States Patent
Tanabe

(10) Patent No.: US 6,791,067 B2
(45) Date of Patent: Sep. 14, 2004

(54) FUSION WELDING APPARATUS FOR OPTICAL FIBER

(75) Inventor: Akio Tanabe, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/638,106

(22) Filed: Aug. 7, 2003

(65) Prior Publication Data

US 2004/0091220 A1 May 13, 2004

Related U.S. Application Data

(63) Continuation-in-part of application No. 09/651,817, filed on Aug. 30, 2000, now Pat. No. 6,610,965.

(30) Foreign Application Priority Data

Aug. 31, 1999 (JP) ............................................. 11-244931

(51) Int. Cl.[7] ............................................... G02B 6/255
(52) U.S. Cl. ......................................... 219/383; 385/96
(58) Field of Search ...................... 219/383; 385/96–98; 65/406–407; 264/1.27, 1.24

(56) References Cited

U.S. PATENT DOCUMENTS

| 6,336,750 B1 | 1/2002 | Clark et al. | |
| 6,610,965 B1 * | 8/2003 | Tanabe | 219/383 |

FOREIGN PATENT DOCUMENTS

| JP | 55-110210 | 8/1980 |
| JP | 61-4006 | 1/1986 |
| JP | 61-22310 | 1/1986 |
| JP | 61-45203 | 3/1986 |
| JP | 61-236509 | 10/1986 |
| JP | 3-29807 | 3/1991 |
| JP | 5-134217 | 5/1993 |
| JP | 9-61659 | 3/1997 |
| JP | 11-316315 | 11/1999 |
| JP | 2000-098170 | 4/2000 |

* cited by examiner

*Primary Examiner*—John A. Jeffery
(74) *Attorney, Agent, or Firm*—Knobbe Martens Olson & Bear LLP

(57) ABSTRACT

The present invention provides a compact fusion welding apparatus for optical fibers which has simple construction and which can stabilized discharges of discharge electrodes. Tip ends of a pair of the discharge electrodes (discharge forming ends) (5) are arranged so as to oppose each other via a space. Between tip ends of the discharge electrodes (1), connection end faces of a pair of optical fibers (2) are arranged so that the connection end faces thereof are opposed to each other and the connection end faces of the optical fibers (2) are fusion welded by discharge heat from the discharge electrodes (1). Dielectric bodies (4) are provided along the longitudinal direction of the discharge electrodes (1) in a form so as to sandwich the discharge electrodes (1) from both sides thereof. By means of the dielectric bodies (4), electric fields in the vicinity of the discharge forming ends (5) between the discharge electrodes (1) are stabilized and the swaying air between the discharge electrodes (1) is prevented, thereby the sway of discharge between the pair of discharge electrodes (1) is suppressed, and thus the discharges are stabilized.

6 Claims, 6 Drawing Sheets

Fig. 6
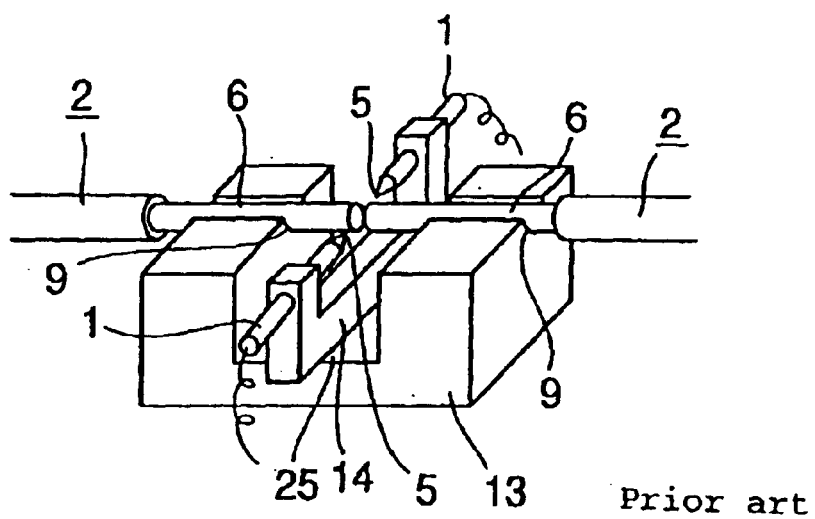
Prior art
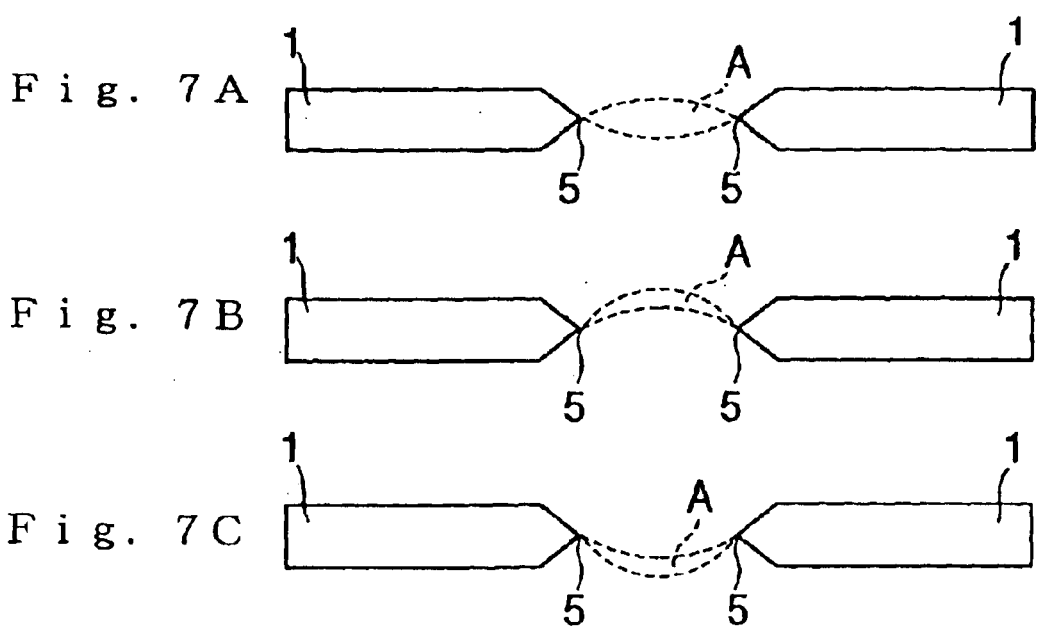
Fig. 7A
Fig. 7B
Fig. 7C

Prior art

Power source for discharge

Power source for coil

FUSION WELDING APPARATUS FOR OPTICAL FIBER

RELATED APPLICATIONS

This application is a continuation-in-part (CIP) of, and hereby incorporates in its entirety by reference, U.S. application Ser. No. 09/651,817, entitled "FUSION WELDING APPARATUS FOR OPTICAL FIBER", filed Aug. 30, 2000 now U.S. Pat. No. 6,610,965, which claims priority to Japanese Application No. 11-244931, filed Aug. 31, 1999.

BACKGROUND OF THE INVENTION

Field of Invention

The present invention relates to a fusion welding apparatus for optical fibers used for permanently connecting optical fibers to each other.

As is common knowledge, fusion welding apparatuses for fusion welding optical fibers by making use of high frequencies and high voltage discharges are used and, in FIG. 6, an example of this type of fusion welding apparatuses for optical fibers is shown. As shown in the same figure, this type of fusion welding apparatus for optical fibers comprises a pair of discharge electrodes (discharge electrode rods) 1 for fusion welding optical fibers. In the apparatus illustrated in FIG. 6, the discharge electrodes 1 are retained by a U-shaped electrode retaining member 14 and discharge forming ends 5 on the tip ends of the discharge electrodes are arranged so as to oppose each other via a space. Between the discharge electrodes 1, a pair of optical fibers 2 are arranged so that connection end face sides thereof are opposed to each other, and which are arranged, for example, so that the optical axis of the optical fibers and the axis of the discharge electrodes 1 are roughly orthogonal to each other.

The optical fibers 2 are arrayed on the optical fiber arraying means 13 in a condition where sheathes on the tip end sides are removed and bare optical fibers 6 are exposed. On the surface of the optical fiber arraying means 13, V grooves 9 serving as optical fiber aligning grooves to insert the bare optical fibers 6 are formed. Herein, in the apparatus illustrated in FIG. 6, the optical fiber arraying means 13 are formed in the U-shape and the electrode retaining means 14 is fixed on a U-shaped concave portion 25 of the optical fiber arraying means 13.

Also, on the pair of discharge electrodes 1, a power source for discharge (not illustrated) is connected and by driving the power source for discharge, the connection end faces of the optical fibers 2 are fusion welded by discharge heat from the discharge electrodes 1.

Incidentally, in the abovementioned fusion welding apparatus for optical fibers, as shown in FIG. 7A, it is desirable that discharges A between the pair of electrodes 1 are stable, however, in actual fact, as shown in FIG. 7B and FIG. 7C, a phenomena where the discharges A sway and become unstable is recognized.

As a factor of the sway of the discharges A, the sway of the air due to the wind can be considered. In addition, as another factor of the sway of the discharges A, it is considered that electric field conditions surrounding the discharges change due to changes in the environment inside the fusion welding apparatus etc., thereby the location of the discharges is distorted or shifted. That is, in the fusion welding apparatus for optical fibers, for example, fusion mechanism portions such as an alignment mechanism (not illustrated) of the optical fibers 2 are provided, and it is considered that positions of these mechanism portions slightly change in each connecting operation and electric field conditions surrounding the discharges change due to subtle balance of an incorporated position of each portion of the fusion mechanism portion, thereby the location of the discharges is distorted and shifted.

Therefore, in order to prevent the discharges A from swaying under the influence of the wind, as shown in FIG. 8, a fusion welding apparatus for optical fibers which is provided with a windshield cover 12 for covering the connection end face sides of the optical fibers 2, discharge electrodes 1, optical fiber arraying means 13, and electrode retaining member 14 as a whole has been suggested.

Also, as shown in FIG. 9 and FIG. 10, fusion welding apparatuses for optical fibers which are provided with magnetic field control mechanisms for suppressing (compensating) the sway of the discharges A by controlling magnetic fields have been suggested. In the fusion welding apparatus for optical fibers as shown in FIG. 9, a coil 10 is wound around a magnetic core 23 for horizontal deflection and when a power source for discharge 8 is driven, a high frequency current is supplied with the coil 10, whereby magnetic fields are generated in a gap 24 of the magnetic core 23, thereby the sway of the discharges between the discharge electrodes 1 has been suppressed.

In the fusion welding apparatus for optical fibers as shown in FIG. 10, the magnetic core 23 and coil 10 for horizontal deflection are replaced with a magnetic core 23 and a coil 10 for vertical deflection, and by an effect similar to the case of FIG. 9, the sway of the discharges A is suppressed. Furthermore, in FIG. 9 and FIG. 10, 3 denotes a fiber cramp for cramping the optical fibers 2 and 16 denotes a driving unit.

However, as shown in FIG. 8, in the apparatus provided with the windshield cover 12, the sway of the discharges between the discharge electrodes 1 due to the wind can be suppressed, whereas the sway of the discharges between the discharge electrodes due to other factors cannot be suppressed, therefore, there have been many cases where the sway of the discharges between the discharge electrodes 1 cannot completely be suppressed. In addition, since such fusion welding apparatuses for optical fibers as described above are used for lay work of optical fibers, etc. to make the apparatuses lightweight and compact is demanded, however, in terms of the apparatuses shown in FIG. 9 and FIG. 10, there have been problems such that the apparatuses increase in size since the mechanisms for magnetic field control are provided and, moreover, the apparatuses have no practical use due to the large power consumption thereof.

SUMMARY OF THE INVENTION

The present invention is made for solving the above-described conventional problems as described above, and the object thereof is to provide a compact fusion welding apparatus for optical fibers which has a simple construction and which can stabilize discharges between discharge electrodes.

In order to achieve the above-described object, the present invention provides a fusion welding apparatus for optical fibers having the following construction. That is, a fusion welding apparatus for optical fibers according to the present invention is constructed so that a pair of discharge electrode tip ends, to which optical fibers are fusion welded, are arranged to oppose each other via a space, and connection end faces of a pair of optical fibers, which are arranged so that the connection end face sides thereof are opposed to each other between the discharge electrode tip end faces, are fusion welded by discharge heat from the discharge electrodes, wherein; dielectric bodies for suppressing the sway of discharges between the pair of discharge electrodes are provided.

Preferably, the dielectric bodies are provided along the longitudinal direction of the pair of discharge electrodes in a form so as to sandwich said pair of discharge electrodes from both sides thereof.

Furthermore, if necessary, in addition to providing the dielectric bodies, a windshield cover for covering, at least, a space between the discharge electrode tip ends and optical fiber connection end face sides is provided.

As an example mode of the present embodiment, the dielectric bodies are attached inside the windshield cover. And as a preferable example mode, the windshield cover is an open-and-close type cover which opens and closes by rotations around a spindle as its fulcrum and by a closing operation of the windshield cover, the pair of dielectric bodies are arranged along the longitudinal direction of the discharge electrodes at positions so as to sandwich said discharge electrodes from both sides thereof.

In the fusion welding apparatuses for optical fibers according to the present invention and prior art, electric fields as shown in FIG. 3A generate when a current flows between the pair of discharge electrodes arranged so that the tip ends oppose each other via the space. Namely an X axis shown in FIG. 3A corresponds to the axial center of the pair of discharge electrodes. When an axis which goes through the center between the discharge electrode tip ends and which is orthogonal to the X axis is provided as a Y axis so that space coordinates in terms of X and Y are formed, electric lines of force are shown by dashed lines while the equipotential lines are shown by solid lines in this space coordinates. Herein, q denotes a positive charge, –q denotes an negative charge, a position of the discharge forming end (tip end) of one of the pair of discharge electrodes is the position shown by q in the figure, and a position of the discharge forming end (tip end) of the other discharge electrode is the position shown by –q in the figure.

However, such electrical fields are changeable due to the above described changes in the environment inside the fusion welding apparatus and the electrical fields are unstable, therefore, it is considered that the discharges between the discharge electrodes sway when electric field conditions surrounding the discharge electrodes change.

Also, it is considered that the sway of the discharges also occurs, as described above, due to the sway of the air between the discharge electrodes.

With respect to problems, according to the present invention, the dielectric bodies (solid dielectrics) which suppress destabilization of the electric fields and the sway of the air at the same time and suppress the sway of the discharges between the pair of discharge electrodes, thereby enabling suppression of the sway of the discharges between the discharge electrodes, thus enabling stabilization of the discharges.

Hereinafter, the suppressive effects for the sway of the discharges between the discharge electrodes by means of the dielectric bodies will be described. Since dielectrics polarize when they are present in electric fields, for example, as shown in FIG. 3B, the dielectrics polarize when electric lines of force pass therethrough. Accordingly, in the electric fields as shown in FIG. 3A, when dielectric bodies 4 are provided along the longitudinal direction of discharge electrodes 1 in a form so as to sandwich discharge forming ends 5 of the discharge electrodes 1 from both sides thereof as shown in FIG. 2, the dielectric bodies 4 polarize as shown in FIG. 2 due to the electric lines of force shown by the dashed lines.

Thus, in the present invention, it is considered that the dielectric bodies polarize as described above, thereby enabling the provision of effects similar to those in a case where the vicinities of the dielectric electrodes are shielded, and thereby the electric field conditions in the vicinities of the discharges are allowed to lock, and therefore it is considered that the sway of the discharges caused by the sway of the electric fields can be suppressed.

Furthermore, by setting a distance L between the dielectric bodies (refer to FIG. 1) to the same degree as the distance between the discharge electrode tip ends or to a lower degree, the electric fields inside the dielectric bodies also take regulation effects and by adjusting the central position of the distance between the two dielectric bodies so as to coincide with the axial center of the dielectric electrodes, the discharges between the discharge electrodes are stably formed around the axial center of the discharge electrodes as shown in FIG. 7A.

Moreover, by providing the dielectric electrodes, the air around the dielectric electrodes decreases, whereby a flow of air between the discharge electrodes is suppressed accordingly and then, the sway of the discharges due to the sway of the air is suppressed. In particular, by setting the distance L between the dielectric bodies to 3 mm or less, occurrence of convection of the air which exists in the space between the dielectric bodies is significantly suppressed.

According to the above descriptions, in the present invention, the sway of the discharges between the pair of discharge electrodes is suppressed and the discharges between the discharge electrodes are stabilized. In particular, according to the present invention, for example, by providing the dielectric bodies along the longitudinal direction of the pair of discharge electrodes whose tip ends are arranged so as to oppose each other via the space in a form so as to sandwich the discharge electrodes from both sides thereof, electric fields which generate when a current flows can be stabilized by actions of the dielectric bodies.

Furthermore, since the dielectric bodies are provided, the air in the vicinity of the discharge forming portions of the discharge electrodes decreases, thereby the sway of the air between the discharge electrodes is suppressed. As a result, the sway of the discharges between the discharge electrodes is suppressed, thus the discharges are stabilized.

Also, in the present invention, by a simple composition, for example, such that the dielectric bodies are provided along the longitudinal direction of the pair of discharge electrodes in a form so as to sandwich said discharge electrodes from both sides thereof, stabilization of the discharges between the pair of discharge electrodes can be realized, therefore, no large-scale control mechanism such as a magnetic field control mechanism is necessary, and thus the apparatus can be made compact.

Furthermore, in terms of the apparatus wherein the windshield cover is provided, since the sway of the air between the dielectric electrodes due to the wind, etc. can be suppressed, the sway of the discharges between the dielectric electrodes can be suppressed more securely, thereby the discharge can be stabilized.

Furthermore, in terms of the apparatus wherein the dielectric bodies are attached inside the windshield cover, since the dielectric bodies can be arranged at appropriate positions in accordance with the opening and closing operations of the windshield cover, the arrangement operations of the dielectric bodies can be simplified.

BRIEF DESCRIPTION OF THE DRAWINGS

Exemplary embodiments of the invention will now be described in conjunction with the drawings in which;

FIG. 6 is an explanatory view showing a construction of the fusion welding apparatus for optical fibers according to the prior art.

FIG. 7A, FIG. 7B, and FIG. 7C are explanatory views showing various exemplary conditions of discharges between pairs of discharge electrodes.

DETAILED DESCRIPTION OF THE PREFERRED EMBODIMENT

Figure 1:
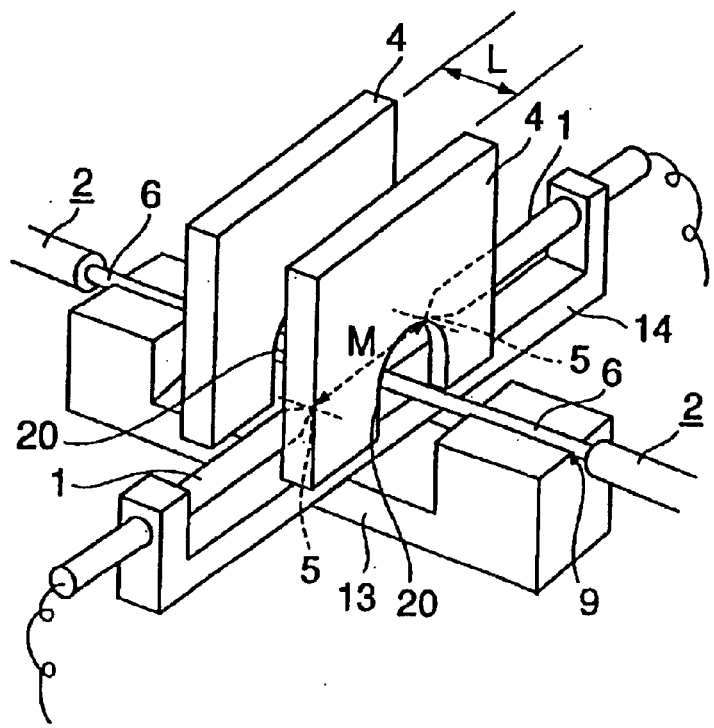
FIG. 1 is a major portion constructional view shown in a perspective view showing a first embodiment of the fusion welding apparatus for optical fibers according to the present invention.

Hereinafter, the present invention will be described in detail based on preferred embodiments with reference to the attached drawings. Here, in the descriptions of the present embodiments, the same symbols are used for portions of the same name as those of the prior art and repeated description thereof will be omitted or simplified. In FIG. 1, a major portion construction of a first embodiment of the fusion welding apparatus for optical fibers according to the present invention is illustrated.

As shown in FIG. 1, in the present invention, the discharge electrodes 1 and optical fiber arraying means 13, etc. are constructed in almost the same manner as those in the prior art fusion welding apparatus for optical fibers shown in FIG. 6. Unlike the prior art, what is featured in the present invention is that the dielectric bodies 4 for suppressing the sway of the discharges between the pair of discharge electrodes 1 are provided along the longitudinal direction of the discharge electrodes 1 in a form so as to sandwich the discharge electrodes 1 from both sides thereof.

In one embodiment, the dielectric bodies 4 are formed of zirconium ceramic plates, for example. It is desirable to select a dielectric body that is characterized by a dielectric constant of at least 10 (at 1 MHz). For example in one embodiment, the dielectric bodies 4 may comprise a material having a dielectric constant of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, or any range selected within such dielectric constants. It is noted that the higher the dielectric constant of the dielectric bodies 4, the more likely the electric field will lock sufficiently in the vicinity of the discharges A (see FIG. 2). The distance L between the pair of dielectric bodies 4 is set to 3 mm and the dielectric bodies 4 are arranged so that the central position of the space and the axial center of the discharge electrodes 1 coincide with each other. Also, on the lower portion side of the dielectric bodies 4, aperture portions 20 through which bare fibers 9 of the optical fibers 2 are inserted are formed, respectively. Herein, in the present embodiment, the tip end distance M of the discharge electrodes 1 is set to 2.6 mm.

Figure 2:
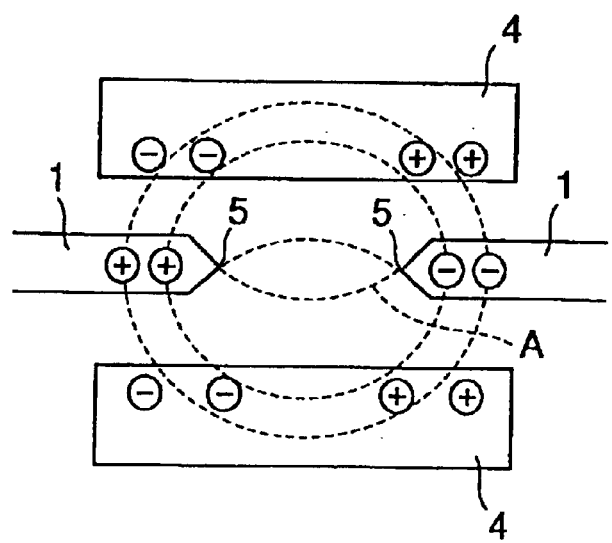
FIG. 2 is an explanatory view in a plan schematically showing an arrangement of the dielectric bodies 4 and the electrical fields in the vicinity of the discharge forming ends 5 of discharge electrodes 1 in the above-mentioned embodiment.
Figure 3A:
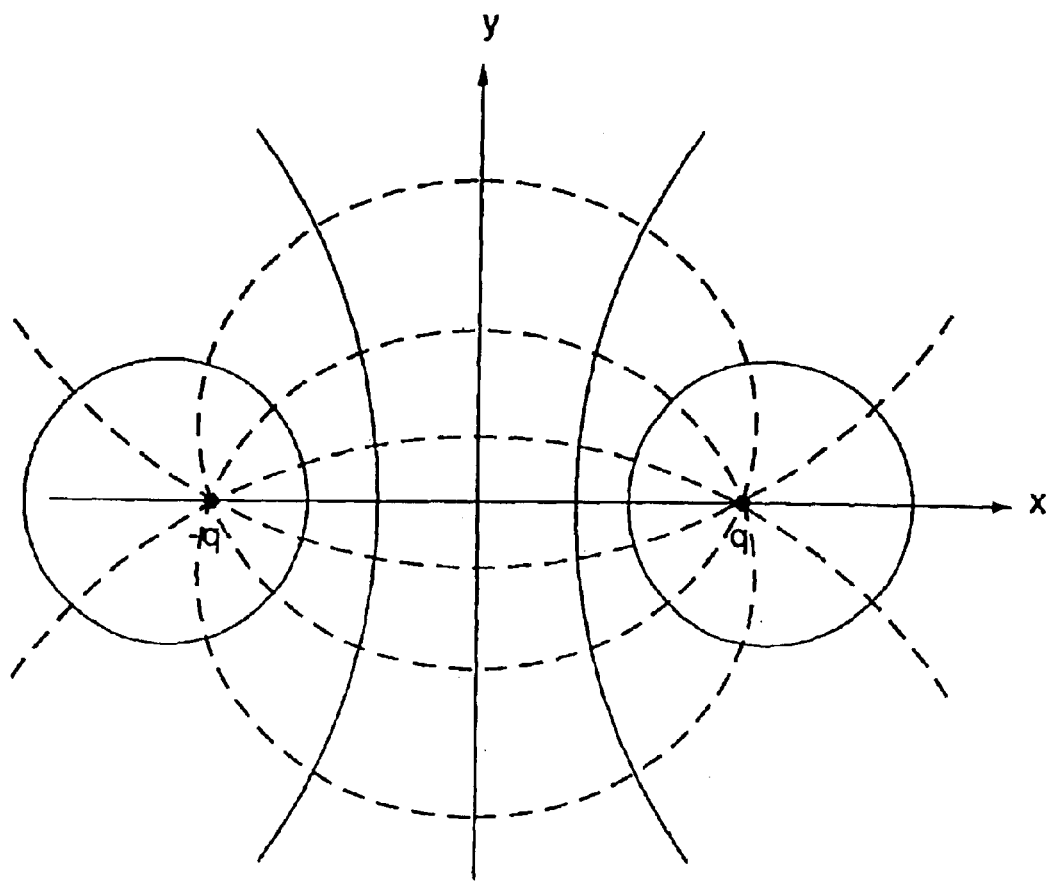
FIG. 3A is an explanatory view showing electrical fields in the vicinity of discharge forming ends of a pair of discharge electrodes and FIG. 3B is an explanatory view showing a condition where the electric fields pass through a dielectric and the following polarized condition of the dielectric, respectively.
Figure 3B:
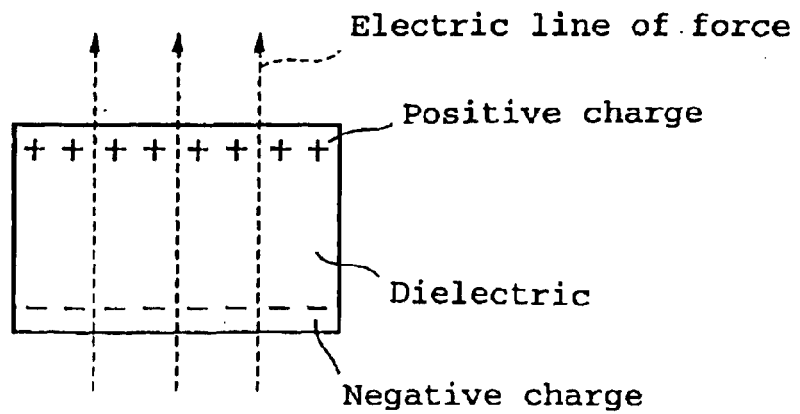

The present embodiment is constructed as described above and connection end face sides of the optical fibers are fusion welded by operations similar to those in the prior art in the present embodiment as well. However, since the dielectric bodies 4 are provided along the longitudinal direction of the discharge electrodes 1 in a form so as to sandwich the discharge forming ends 5 of the discharge electrodes 1 from both sides thereof, the dielectric bodies 4 polarize as shown in FIG. 2, thereby the electric fields between the discharge electrodes 1 are stabilized. Consequently, the sway of the discharges due to the sway of the electric fields is suppressed.

In particular, according to the present embodiment, the distance L between the dielectric electrodes is set to 3.0 mm so as to be an approximate value to the distance between the discharge electrode tip ends of 2.6 mm, thereby the electric fields inside the dielectric bodies 4 also take the regulation effects. And, in the present invention, since the central position of the distance L between the two dielectric bodies 4 is made coincide with the axial center of the discharge electrodes 1, the center of the discharges between the discharge electrodes 1 can be made coincide with the axial center of the discharge electrodes, thus the sway of the discharges due to the sway of the electric fields can be more securely suppressed.

Also, in the present invention, since the dielectric bodies 4 are provided, the air around the discharge electrodes 1 such as the vicinity of the discharge forming portions 5 of the discharge electrodes 1 can be reduced, whereby the flow of air between the discharge electrodes can be suppressed accordingly, therefore the sway of the discharges due to the sway of the air can be suppressed.

In particular, the present inventor has confirmed that by setting the distance L between the dielectric bodies 4 to 3 mm or less, occurrence of convection of the air which exists in the space between the dielectric bodies is significantly suppressed. Based on the fact, the distance L between the dielectric bodies 4 is set to 3 mm or less in the present embodiment, therefore the sway of the discharges due to the sway of the air can be securely suppressed.

As has been described above, according to the present embodiment, both the sway of the discharges due to the sway of the electric fields and sway of the discharges due to the sway of the air can be suppressed and the discharges between the discharge electrodes 1 can be stabilized. In fact, when the present inventor performed fusion welding for optical fibers by means of the fusion welding apparatus for optical fibers of the present embodiment, the discharges between the discharge electrodes 1 could be stabilized at all times, thereby it was confirmed that fusion welding of the optical fibers can be highly reliably performed.

Furthermore, in the present invention, by a simple composition such that the dielectric bodies 4 are provided so as to sandwich the discharge electrodes 1 from both sides thereof, stabilization of the discharges can be realized, and therefore, no large-scale control mechanism such as the magnetic field control mechanism is necessary, thus the apparatus can be made compact.

Figure 4:
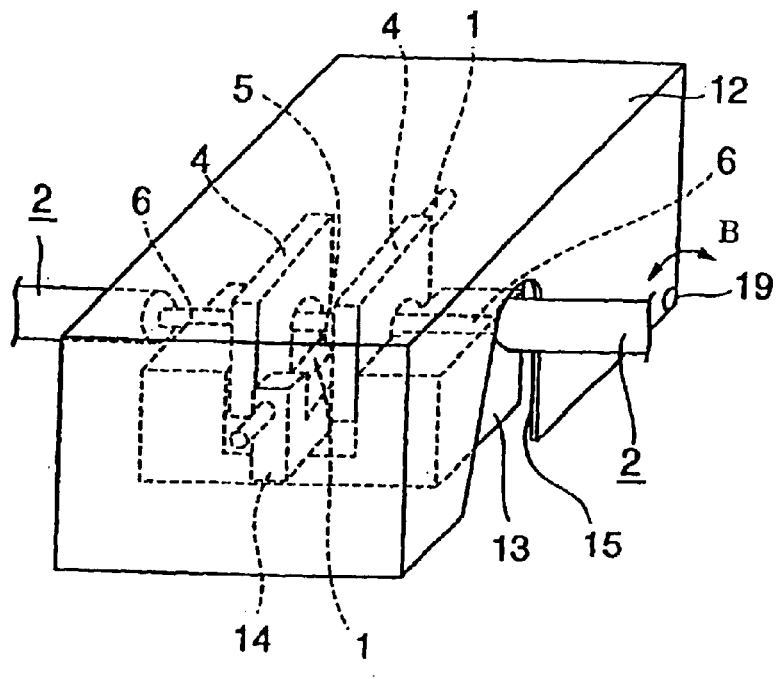
FIG. 4 is a major portion constructional view shown in a perspective view showing a second embodiment of the fusion welding apparatus for optical fibers according to the present invention.

In FIG. 4, a major portion construction of a second embodiment of the fusion welding apparatus for optical fibers according to the invention is illustrated. Here, in the descriptions of the second embodiment, the same symbols are used for portions of the same name as those of the prior art and the first embodiment and repeated description thereof will be omitted or simplified.

In the second embodiment, a fusion welding apparatus for optical fibers is constructed in almost the same manner as that in the above-mentioned first embodiment. Unlike the first embodiment, the feature of the second embodiment is that the windshield cover 12 for covering the connection end face sides of the optical fibers 2, pair of discharge electrodes 1, optical fiber arraying means 13, and electrode retaining member 14 as a whole is provided, and the dielectric bodies 4 are provided inside the windshield cover 12 in the second embodiment. Herein, the windshield cover 12 is provided so that it can freely rotate around the spindle 19 as its fulcrum in the direction of arrow B to open and close, and which is constructed so as to be automatically opened and closed.

The second embodiment is constructed as described above and in accordance with the opening and closing movements of the windshield cover 12, the dielectric bodies 4 move as one body. That is, when the optical fibers 2 are fusion welded by means of the fusion welding apparatus for optical fibers of the second embodiment, the discharge electrodes 1 and optical fibers 2 are set in a condition where the windshield cover 12 is opened, thereafter the windshield cover 12 is rotated around the spindle 19 as its fulcrum and brought into a closed condition. As a result, at this time, the dielectric bodies 4 are arranged along the longitudinal direction of the discharge electrodes 1 at appropriate positions in a form so as to sandwich the discharge electrodes 1 from both sides thereof.

Similar to the first embodiment, by providing the dielectric bodies 4, effects similar to those of the first embodiment can be provided in the second embodiment as well. Also, in the second embodiment, the sway of the air can be suppressed more securely by providing the windshield cover 12, thereby the sway of the discharges of the discharge electrodes 1 can be more effectively suppressed.

In addition, in the second embodiment, the dielectric bodies 4 are attached inside the windshield cover 12 so that they move along with the windshield cover 12 as one body, therefore the arrangement operations of the dielectric bodies 4 can be simplified.

The present invention is not limited to the above-described embodiments but various other embodiments can be taken. For example, in the second embodiment, the windshield cover 12 is provided so as to be freely rotatable around the spindle 19 as its fulcrum, however, for example, the windshield cover 12 may be arranged by manually moving it from the upper portion side of the optical fibers 2, etc. to the lower side thereof.

Also, in the second embodiment, the whole discharge electrodes 1 are covered by the windshield cover 12, however it is sufficient that the windshield cover 12 is constructed so as to cover, at least, the space between the tip ends of the discharge electrodes 1 and the connection end face sides of the optical fibers 2. Nevertheless, when the whole discharge electrodes 1 and optical fiber arraying means 13, etc. are covered by the windshield cover 12 as in the second embodiment, the flow of air between the discharge electrodes 1 is easily suppressed, and by making use of the conventional generally used windshield cover 12 and attaching the dielectric bodies 4 on the windshield cover 12, the construction of the present invention can be easily achieved.

Furthermore, in each of the first and second embodiments, the distance L between the dielectric bodies 4 is set to 3 mm, however, the distance L between the dielectric bodies 4 is not particularly limited and can be appropriately set. Nonetheless, by setting the distance L of the dielectric bodies 4 to 3 mm or less, convection of the air which exists in the space between the discharge bodies 4 can be easily suppressed, furthermore, by setting the distance L between the dielectric bodies 4 to the same degree as the distance between the tip ends of the discharge electrodes 1 or a lower degree, as described before, the sway of the electric fields in the vicinity of the discharge electrodes 1 is suppressed, whereby the discharges between the dielectric electrodes 1 can be easily suppressed.

Figure 5:
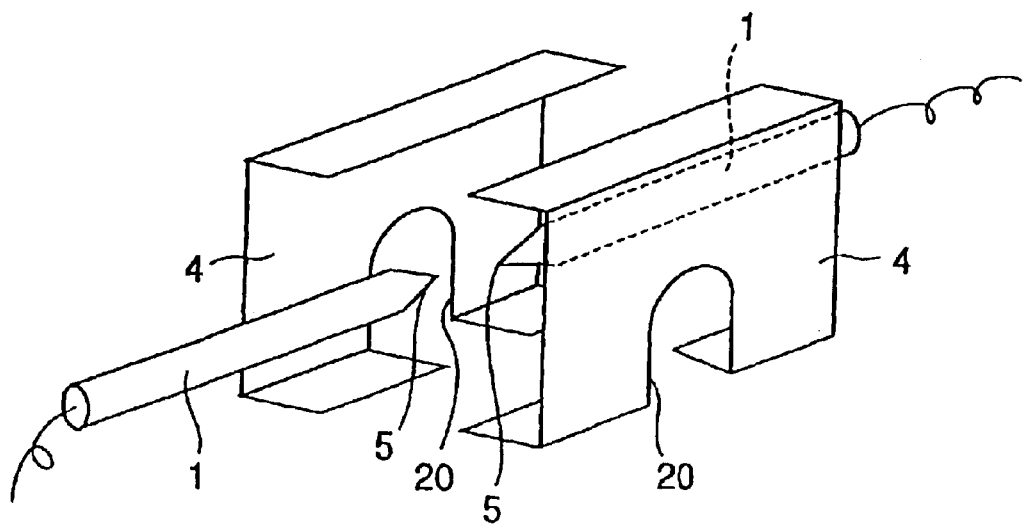
FIG. 5 is an explanatory view showing a form of the dielectric bodies in another embodiment of the fusion welding apparatus for optical fibers according to the present invention along with the discharge electrodes.
Figure 8:
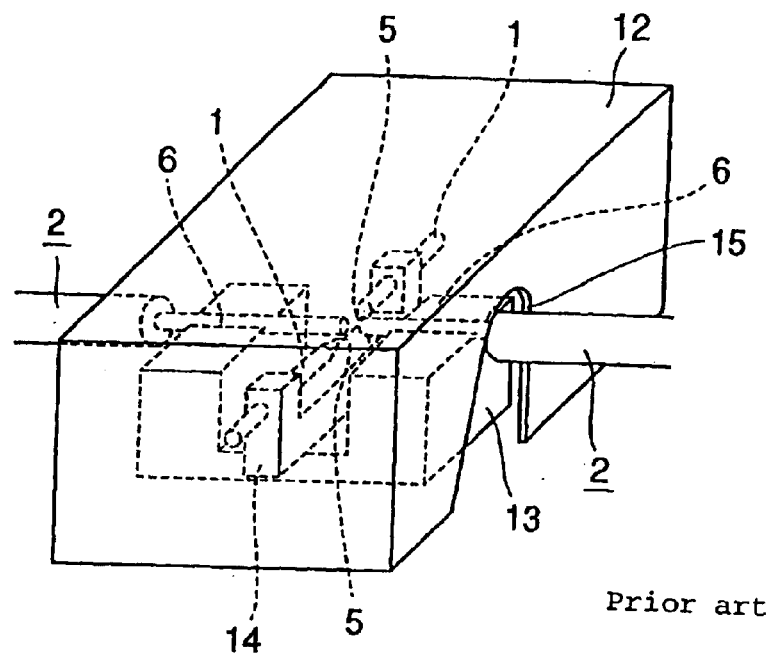
FIG. 8 is an explanatory view showing the prior art fusion welding apparatus for optical fibers which is provided with the windshield cover.
Figure 9:
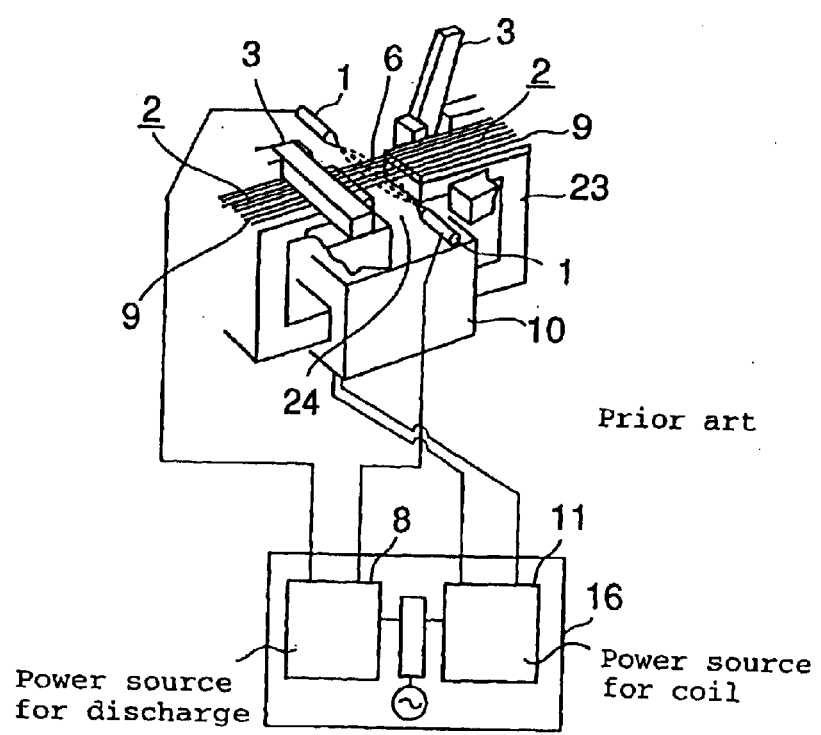
FIG. 9 is an explanatory view showing an example of the prior-art fusion welding apparatus for optical fibers which is provided with a magnetic field control unit.
Figure 10:
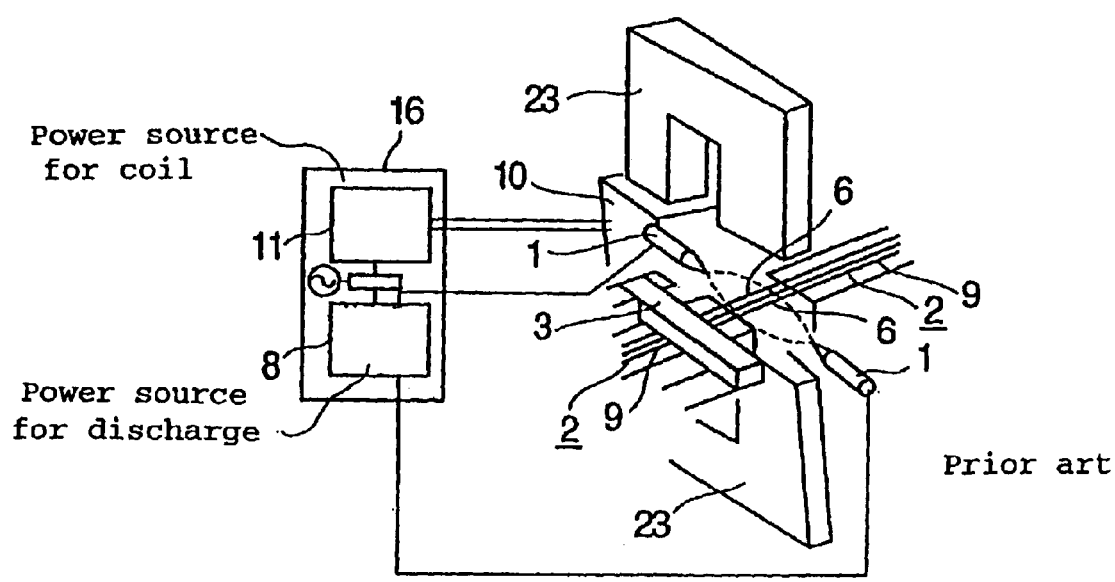
FIG. 10 is an explanatory view showing another example of the prior art fusion welding apparatus for optical fibers which is provided with a magnetic field control unit.

Furthermore, in each of the embodiments, the plate-shaped dielectric bodies 4 are provided along the longitudinal direction of the discharge electrodes 1 in a form so as to sandwich the discharge electrodes 1 from both sides thereof, however, for example, as shown in FIG. 5, the U-shaped dielectric bodies which sandwich the discharge electrodes 1 from both sides thereof may be provided along the longitudinal direction of the discharge electrodes 1 so that the upper and lower sides of the discharge electrodes 1 are also surrounded by the dielectric bodies 4. By such a method, the discharges can be stabilized also in the vertical direction of the discharge electrodes 1, thereby the discharge between the discharge electrodes 1 can become still more stabile.

Furthermore, in each of the embodiments, an example where one of the optical fibers 2 is opposed to the other and these optical fibers 2 are fusion welded to each other is described, however, the fusion welding apparatus for optical fibers according to the present invention can also be applied to an apparatus which makes a plurality of pairs of optical fibers 2 oppose each other and fusion welds these optical fibers 2 collectively.

Furthermore, in the present embodiment, the optical fiber arraying means has a U-shape, however, the present invention can also be applied in an optical fiber alignment type apparatus wherein the respective V groove portions are separated so that positioning can be performed independently.

What is claimed is:

1. A fusion welding apparatus for optical fibers, the apparatus comprising:

a pair of discharge electrode tip ends arranged opposite to each other and separated by a space, wherein connection end faces of a pair of optical fibers are arranged to be fusion welded by discharge heat from the discharge electrodes, and wherein a plurality of dielectric bodies are provided to suppress the sway of discharges between the pair of discharge electrodes, and further wherein the dielectric bodies are polarized by receiving electric lines of force of the discharges from the discharge electrodes to lock the electric field conditions of the discharge area, and wherein the dielectric constant of said dielectric bodies is at least ten (10).

2. The fusion welding apparatus as set forth in claim 1, wherein the dielectric bodies are provided along the longitudinal direction of the pair of discharge electrodes so as to sandwich said discharge electrodes from both ends thereof.

3. The fusion welding apparatus as set forth in claim 1, wherein a windshield cover is provided to cover the space between the discharge electrode tip ends and optical fiber connection end face sides.

4. The fusion welding apparatus as set forth in claim 2, wherein a windshield cover is provided to cover the space between the discharge electrode tip ends and optical fiber connection end face sides.

5. The fusion welding apparatus as set forth in claim 3, wherein the dielectric bodies are attached to the windshield cover.

6. The fusion welding apparatus as set forth in claim 3, wherein the dielectric bodies are attached to the windshield cover.

* * * * *